US012340917B2

(12) United States Patent
Ehst et al.

(10) Patent No.: US 12,340,917 B2
(45) Date of Patent: Jun. 24, 2025

(54) APPARATUS FOR PRODUCING COPPER-67 RADIOISOTOPE FOR MEDICAL APPLICATIONS

(71) Applicant: UCHICAGO ARGONNE, LLC, Chicago, IL (US)

(72) Inventors: David A. Ehst, Downers Grove, IL (US); James L. Willit, Batavia, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 1004 days.

(21) Appl. No.: 17/355,679

(22) Filed: Jun. 23, 2021

(65) Prior Publication Data
US 2022/0005625 A1 Jan. 6, 2022

Related U.S. Application Data

(60) Division of application No. 16/166,441, filed on Oct. 22, 2018, now Pat. No. 11,049,628, which is a
(Continued)

(51) Int. Cl.
*G21K 5/08* (2006.01)
*B01D 7/00* (2006.01)
(Continued)

(52) U.S. Cl.
CPC .............. *G21K 5/08* (2013.01); *B01D 7/00* (2013.01); *G21G 1/001* (2013.01); *G21G 1/12* (2013.01);
(Continued)

(58) Field of Classification Search
CPC . G21K 5/08; B01D 7/00; G21G 1/001; G21G 1/12; G21G 2001/0094; H05H 6/00; C22B 15/00
(Continued)

(56) References Cited

U.S. PATENT DOCUMENTS 2,806,271 A 9/1957 Operhall
2,935,633 A 9/1957 Peters
(Continued)

FOREIGN PATENT DOCUMENTS

WO 2010034364 A1 4/2010

OTHER PUBLICATIONS

CRC Handbook of Chemistry and Physics, 92nd Edition, (2011-2012), 12-206-12-207.
(Continued)

*Primary Examiner* — Jessee R Roe
*Assistant Examiner* — Michael Aboagye
(74) *Attorney, Agent, or Firm* — Olson & Cepuritis, Ltd.

(57) ABSTRACT

The present invention provides a target unit and a sublimation apparatus suitable for use in a method for producing Cu67 radioisotope suitable for use in medical applications. The apparatus comprises a sublimation tube with one open end. The sublimation tube contains an ingot comprising Zn68 and Cu67 in a ceramic capsule contacting a closed end the sublimation tube. A removable vacuum dome is sealable over the open end of the sublimation tube so that interior of the apparatus can be placed under vacuum.

18 Claims, 5 Drawing Sheets

Related U.S. Application Data division of application No. 15/087,111, filed on Mar. 31, 2016, now Pat. No. 10,134,497, which is a continuation of application No. 13/399,082, filed on Feb. 17, 2012, now Pat. No. 9,312,037.

(60) Provisional application No. 61/540,897, filed on Sep. 29, 2011.

(51) Int. Cl.
  *G21G 1/00* (2006.01)
  *G21G 1/12* (2006.01)
  *H05H 6/00* (2006.01)

(52) U.S. Cl.
  CPC ....... *H05H 6/00* (2013.01); *G21G 2001/0094* (2013.01)

(58) Field of Classification Search
  USPC .......................................................... 266/200
  See application file for complete search history.

(56) References Cited

U.S. PATENT DOCUMENTS

| | | | |
|---|---|---|---|
| 2,942,943 A | 6/1960 | Greene et al. | |
| 3,417,808 A | 12/1968 | Rosenberg | |
| 3,419,348 A | 12/1968 | Hardy | |
| 3,621,261 A * | 11/1971 | Princiotta | G21G 4/06 250/493.1 |
| 4,919,190 A | 4/1990 | Newman et al. | |
| 5,038,046 A | 8/1991 | Norman et al. | |
| 5,279,745 A | 1/1994 | Jeffers et al. | |
| 5,394,910 A | 3/1995 | Sweetland et al. | |
| 5,426,676 A | 6/1995 | Hopkins | |
| 5,784,423 A | 7/1998 | Lidsky et al. | |
| 5,949,836 A | 9/1999 | Lidsky et al. | |
| 5,987,087 A | 11/1999 | Zhuikov et al. | |
| 6,208,704 B1 | 3/2001 | Lidsky et al. | |
| 6,359,952 B1 | 3/2002 | Alvord | |
| 6,490,330 B1 | 12/2002 | Jamriska, Sr. et al. | |
| 7,284,592 B2 | 10/2007 | Yamada et al. | |
| 8,526,561 B2 * | 9/2013 | Ehst | G21K 5/08 376/157 |
| 10,006,101 B2 * | 6/2018 | Stoner | G21G 1/001 |
| 11,049,628 B2 * | 6/2021 | Ehst | G21G 1/12 |
| 2003/0030193 A1 | 2/2003 | Soeda et al. | |
| 2004/0168787 A1 | 9/2004 | Yamada | |
| 2006/0037438 A1 | 2/2006 | Holgersen | |
| 2008/0299023 A1 * | 12/2008 | May | B01D 7/00 422/244 |
| 2010/0028234 A1 | 2/2010 | Ehst et al. | |
| 2011/0002431 A1 | 1/2011 | Johnson et al. | |
| 2011/0235766 A1 | 9/2011 | Stora et al. | |

OTHER PUBLICATIONS

Cyanex 272 Extractant, Solvent Extraction Reagent, Brochure from Cytec Industries, Inc. (2002).

Fritze, K., The Preparation of High Specific Activity Copper 64, Radiochimca Acta, vol. 3 (1964), 166-167.

Jal, P.K., et al., Chemical Modification of Silica Surface by Immobilization of Functional Groups for Extractive Concentration of Metal Ions, Talanta 62 (2004), 1005-1028.

Malinin, A.B. et al., The Formation of 67Cu According to the Reaction 68Zn($\gamma$, p) On A Retarded Beam of a~An Electron Accelerator With An Energy of 25 MeV, Soviet Radiochemistry vol. 12 (5), 780-782 (1970).

Marceau, N., et al., The Production of Copper 67 From Natural Zinc Using A Linear Accelerator, Intl. Journal of Applied Radiation and Isotopes, vol. 21, (1970), 667-669.

Mirzadeh, S., et al., Production of No. Carrier Added 67Cu, Appl. Radiat. Isot., vol. 37(1) (1986), 29-36.

Polak, P. et al., Photonuclear Production of 67Cu From ZnO Targets, Radiochimica Acta 40, 169-173 (1986).

Smith, N.A. et al., The Production, Separation, and Use of 67 Cu for Radioimmunotherapy: A Review, Applied Radiation and Isotopes 70, pp. 2377-2383 (2012).

Yagi, et al., International Journal of Applied Radiation and Isotopes 29, 756-758 (1978).

* cited by examiner

APPARATUS FOR PRODUCING COPPER-67 RADIOISOTOPE FOR MEDICAL APPLICATIONS

CROSS-REFERENCE TO RELATED APPLICATIONS

This application is a division of U.S. application Ser. No. 16/166,441, filed on Oct. 22, 2018, which is a division of U.S. application Ser. No. 15/087,111, filed on Mar. 31, 2016, now U.S. Pat. No. 10,134,497, which is a continuation of U.S. application Ser. No. 13/399,082, filed on Feb. 17, 2012, now U.S. Pat. No. 9,312,037, which claims the benefit of U.S. provisional application Ser. No. 61/540,897, filed on Sep. 29, 2011, each of which is incorporated herein by reference in its entirety.

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE INVENTION

This invention relates to methods and a novel device for producing radioisotopes for medical applications. More particularly, this invention relates to methods, as well as novel target units and sublimation devices for producing Cu67 radioisotope.

BACKGROUND OF THE INVENTION

In recent years medical researchers have indicated a desire to explore radioisotope therapy with beta-emitting sources that may simultaneously be monitored by imaging their photon emission. Beta particles with energies of a few hundred KeV have sufficient range in tissue (millimeters) that they can penetrate small tumor masses, without passing much further into the surrounding body and inadvertently destroying healthy tissue. Gamma rays of a few hundred KeV may be conveniently imaged with external cameras. An isotope that emits both particles must also have appropriate chemical properties in order to attach the isotope to a biologically active agent, such as a peptide or monoclonal antibody. Copper-67 (Cu67) has emerged as one of the most desired of these new radioisotopes; it emits beta particles with mean energy of 141 KeV and a gamma ray of 185 KeV. Its half-life of 2.6 days, however, demands rapid production, processing, and transfer to the medical clinic. Therapy of non-Hodgkin's lymphoma is perhaps the most recognized application for Cu67, but the dearth of supply has seriously inhibited the research effort in this area.

Cu67 has been produced by two main processes, i.e., in nuclear reactors in small quantities, and by bombardment of zinc oxide (ZnO) with high energy protons.

In the mid 1990s, Cu67 was produced by irradiation of ZnO in DOE-subsidized high-energy physics proton accelerators, e.g., BLIP at Brookhaven National Lab (BNL) and LAMPF at Los Alamos National Lab (LANL). By 2000, DOE changed its focus, with additional production being performed on the proton cyclotron at TRIUMF, in Canada, and import of the Cu67 to medical researchers in the United States.

Reactor production of Cu67 is particularly difficult for several reasons. For example, neutron flux results in a number of harmful, unwanted other isotopes, which are difficult to remove from the desired Cu67. Human medical treatment applications require non-copper impurities to be reduced to parts-per-billion (ppb) levels, elimination of radioisotopes of copper other than Cu67, and a high specific activity (no more than a few hundred stable copper atoms for each Cu67 atom). In addition, the reactor method needs a sophisticated mechanical rabbit to retrieve the isotope from the core, and radioactive waste handling is costly (frequently requiring subsidization by national governments), which generally hinders economic production of radioisotopes.

Linear accelerator ("linac") production at BLIP and LAMPF was technically successful, but the two labs simply could not provide enough Cu67 to meet the demand. Production was limited to a total of about 1 Ci per year, due to scheduling demands on the accelerators for high-energy physics missions. Also, proton accelerator production requires irradiation of the target in a vacuum, and the machine must be opened to atmospheric pressure to recover the target, complicating the recovery.

In the past, metal zinc target capsules have been used on electron accelerators to provide high yields of Cu67 via a photonuclear process (gamma rays from Bremsstrahlung convert Zn68 into Cu67). Zinc material was then irradiated, and Cu67 would be separated very quickly and efficiently using a sublimation process. Both the metal casting process into metal target capsules and subsequent sublimation attempts with metal apparatus have resulted in unacceptable levels of metal impurities, which were introduced by corrosive chemical reactions of zinc in the liquid and vapor phases.

Accordingly, there is an ongoing need for improved methods for producing Cu67, particularly having a purity and specific activity suitable for medical applications. The present invention addresses this need.

SUMMARY OF THE INVENTION

The present invention provides a photonuclear method for producing Cu67 radioisotope suitable for use in medical applications. The method comprises irradiating metallic zinc-68 (Zn68) contained within a closed ceramic capsule with a high energy gamma ray beam to convert at least a portion of the Zn68 to Cu67, and then isolating the Cu67 from the irradiated target. During irradiation, at least a portion of the Zn68 is converted to Cu67 by loss of a proton. Preferably, the irradiation is continued until the conversion of Zn68 to Cu67 yields a Cu67 activity of at least 5 milliCuries-per-gram of target (mCi/g). Our work has uncovered that composing the target capsule and sublimation apparatus out of ceramic materials that do not chemically react with molten zinc (e.g., alumina, aluminum nitride and boron nitride), and in particular alumina, offers a solution to avoiding the introduction of impurities during casting or sublimation known to take place in prior equipment.

The present invention also provides an improved target unit for producing Cu67 radioisotopes. It also provides for easier handling and shipping of the target because of its use of low activation materials. The target unit includes a target body having a cage body coupled to a screw-on cap and a ceramic capsule containing the Zn68 target. The ceramic capsule is sealed within the target body between the cage body and the screw-on cap to form a substantially water-tight seal during irradiation. The ceramic capsule material must be selected to prevent chemical reaction with zinc;

nevertheless, it must promote a solid physical contact between the capsule and solid Zn68 target ingot within the capsule. Even a small gap between the capsule and the Zn ingot would inhibit heat transport out of the zinc during high-power irradiation, resulting in melting and possible failure of the target. For this reason certain non-metals, such as graphite and boron nitride, are not appropriate for the target capsule. Alumina is an example of one satisfactory material of construction for the capsule. The initial stock of Zn68, and any additions of fresh stock to replace losses, must be substantially free of residual traces of oxygen. Substantially oxygen-free zinc promotes good physical contact between the cast ingot and the ceramic capsule. Substantially oxygen-free zinc can be prepared by subliming the Zn68 at least once prior to forming the target ingot. As used herein, the term "substantially oxygen-free zinc" and grammatical variations thereof, refer to trace oxygen levels within the target ingot that are low enough to prevent loss of adhesion between the capsule and the zinc target ingot during irradiation.

The present invention also provides for an improved apparatus for subliming the irradiated metallic zinc target material from the Cu67 radioisotope. The sublimation apparatus comprises a ceramic sublimation body, which is a vacuum sealable tube with one open end. A ceramic capsule containing the irradiated metallic zinc target is placed within the sublimation body. The sublimation body is coupled to a vacuum source, which forms a leak-tight vacuum seal at temperatures between approximately 500 to about 700° C. The ceramic sublimation body material must be chosen to prevent chemical reaction with zinc liquid and vapor, but the zinc vapor from sublimation must deposit and physically adhere to the interior of cooler regions of the tube that are not directly heated. Additionally, upon later heating, the deposited zinc must melt and flow freely for subsequent recovery of the expensive Zn68 to refill and cast a new target ingot within a new capsule. For this reason certain non-metals, such as quartz/glass, are not appropriate for the sublimation body. Alumina is one example of a satisfactory material of construction for the sublimation tube.

In addition, the present invention provides an improved method for recovering the sublimed Zn68 from the sublimation tube. In particular, the open ended ceramic sublimation tube is inverted over a hopper in order to fill a new ceramic capsule. The inverted sublimation tube and hopper are placed within a hermetic surround and heated in an inert atmosphere. The hopper funnels the molten zinc into the new ceramic capsule. For this process the hopper must be constructed from a non-metallic material which has no chemical reaction with molten Zn; graphite or glassy carbon are satisfactory materials, which may be easily fabricated into the desired hopper dimensions to properly align with the opening of the tube.

Further details regarding sublimation and irradiation of zinc for producing Cu67 radioisotope are described in U.S. patent application Ser. No. 12/462,099, filed Jul. 29, 2009, the disclosure of which is incorporated herein by reference in its entirety.

BRIEF DESCRIPTION OF THE DRAWINGS

The invention consists of certain novel features and a combination of parts hereinafter fully described, illustrated in the accompanying drawings, and particularly pointed out in various aspects of the invention, it being understood that various changes in the details may be made without departing from the spirit, or sacrificing any of the advantages of the described invention.

DETAILED DESCRIPTION OF PREFERRED EMBODIMENTS

Figure 1:
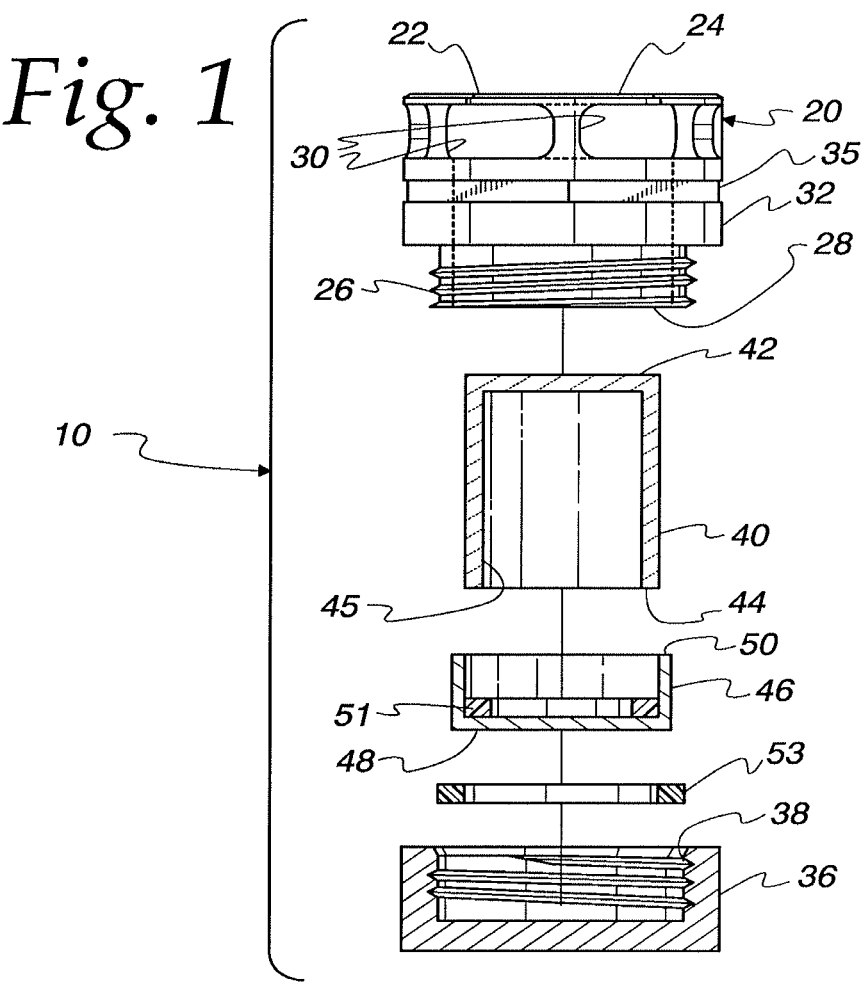
FIG. 1 depicts an exploded representation of a target unit useful in the methods of the present invention, in partial cross-section.

The present invention provides a method for producing Cu67 radioisotope comprising irradiating a metallic Zn68 target with a high energy gamma ray beam to convert Zn68 atoms to Cu67, and then isolating the Cu67 from the irradiated target.

Preferably, the target to be irradiated comprises at least about 90% Zn68, more preferably at least about 95% Zn68, and even more preferably at least about 99% Zn68. It is particularly preferred that the Zn68 target include as low a level of copper contaminant as is practical, in order to minimize the amount of cold copper recovered after irradiation to produce radioactive Cu67. Zn68 containing low levels of copper can be obtained, for example, by repeated sublimation or by zone refining of the Zn68. At each sublimation stage less than 10% of the small amount of copper in the target material is transferred with the sublimed material, thereby affording a higher ratio of radioactive copper to cold copper after each cycle until substantially all of the cold copper is depleted from the zinc.

The quantity, $Q_1$, of initial copper in the bulk zinc target can be measured, as can the amount of copper, $Q_2$, left in the sublimed zinc deposit. The metric $r=(Q_2/Q_1)\times 100\%$ (i.e., the percentage of copper left in the sublimed zinc) is a figure of merit, which provides an assessment of the efficiency of the sublimation process for removing trace amounts of copper from the bulk zinc. In six different sublimation runs, the percentage of copper removed from the zinc during sublimation was in the range of 85 to 99.5% (i.e., values of $r=0.5\%$, $r<1.4\%$, $r=2.5\%$, $r=3.6\%$, and $r\leq 15\%$ were observed). Based on these observations, recycling of the target zinc material will likely reduce trace amounts of cold copper by orders of magnitude after a few sublimation cycles. Thus, utilizing Zn68 that has been repeatedly sublimed (e.g., Zn68 sublimate recovered from repeated runs of the present methods) will lower the level of cold copper present in the Cu67 obtained after irradiation, and thus increase the specific activity of the Cu67 in the copper isolated from the process. The sublimation processing procedure can thus provide an extremely high specific activity of Cu67. For example, the radioisotope Cu67 product supplied to customers can have fewer than ten cold (nonradioactive, stable) copper atoms for each Cu67 atom. This is equivalent to a specific activity of ≥75 kCi/gram of copper.

The Zn68 target present in the ceramic capsule can be configured in any suitable and convenient manner. For example, the target can be configured in the form of a frustum, a straight cylinder, or any other suitable shaped solid mass, and the like. The target and capsule can also be housed in a unit as desired, which preferably provides a water-tight seal for the capsule. The Zn68 within the capsule can be any solid monolithic ingot in tight contact with the capsule, such as a solid plate, a solid cylinder, or any other suitable configuration. Good physical contact between the solid ingot and the capsule can be achieved by pre-sublimation of the zinc to guarantee removal of oxygen from the metal. The target preferably has a mass in the range of about 100 to about 200 grams, although smaller and larger targets are suitable, as well.

The Zn68 target is irradiated with a gamma ray beam having an intensity of at least about 1.3 kW/cm2, and comprising gamma rays having an energy of at least about 30 MeV. In a preferred embodiment, the gamma rays are produced by irradiating a tantalum target (Ta converter) with a high energy electron beam (e.g., 40-50 MeV, 6-10 kW) from a linear accelerator. The irradiation produces gamma rays of suitable energy for converting Zn68 to Cu67. Preferably, the tantalum is irradiated with a high power electron beam having a beam energy in the range of about 40 MeV to about 100 MeV and a beam current in the range of about 100 to about 200 microAmperes. Irradiation of the tantalum results in production of gamma rays having an energy in the range of about 40 to about 100 MeV, which is well suited for conversion of Zn68 to Cu67. Preferably, the irradiation is continued until the conversion of Zn68 to Cu67 yields a Cu67 activity in the target of at least about 5 milliCuries-per-gram of target (mCi/g), more preferably at least about 10 mCi/g, even more preferably at least about 20 mCi/g. Typical irradiation times are in the range of about 24 to 72 hours.

The tantalum converter preferably has a thickness in the range of about 1 to about 4 mm and can comprise a single plate of tantalum or multiple stacked plates. Alternative converter materials include tungsten (preferably coated with a thin layer of Ta for chemical stability), or heavier metals such as lead (e.g., encased in a sealed jacket).

The tantalum converter and the Zn68 target can be configured in any suitable manner within the electron beam of the linear accelerator. Due to the inevitable heating of the converter and target, cooling may be required during irradiation to avoid mechanical failure of the target (e.g., melting). Preferably, the converter and target are cooled by a recirculating cooling system (e.g., immersed in a forced-flow cooling water bath) while in the beam path of the linear accelerator. The target ceramic capsule is mounted in a holder or target unit that is water tight and may include cooling fins in a suitable number and size to aid in dissipating the heat generated during the irradiation, if desired. The target unit or holder with its included target preferably is immersed within cooling water during irradiation. After irradiation, the linear accelerator is shut down, the cooling water flow is stopped, and the target unit is removed for processing to recover the Cu67 therefrom.

FIG. 1 illustrates a partial cross-sectional view of an exemplary embodiment of target unit 10, which houses the target and capsule during irradiation. Target unit 10 includes threaded cage body 20 and screw-cap 36, which can be screwed together to house capsule 40. Cage body 20 is substantially cylindrical having a top 22 defining an aperture 24 and an open male-threaded bottom portion 26, which defines opening 28 sized and configured to receive capsule 40. Cage body 20 also defines circumferential oblong apertures 30. A portion 32 of cage body 20 between male-threaded bottom portion 26 and apertures 30 defines a groove 35. Capsule 40 includes a closed end 42 and open end 44, together defining target cavity 45. Metal lid 46 includes closed end 48 and open end 50, which is sized and configured to receive open end 44 of capsule 40. Gasket 51 is disposed within lid 46 to seal against open end 44 of capsule 40. When assembled, closed end 42 of capsule 40 is received within open end 28 of cage body 20, while lid 46 covers open end 44 of capsule 40, with gasket 51 therebetween. Female threaded portion 38 of screw-cap 36 is engaged with male threaded portion 26 of cage body 20 such that screw-cap 36 and cage body 20 together exert sufficient force on cap 36 to provide a water-tight seal over open end 44 of capsule 40. Preferably, washer 53 is included between screw-cap 36 and closed end 48 of lid 46. In a preferred embodiment, gasket 51 is composed of graphite because it is highly resistant to radiation. Gasket 51 may be composed of other materials, excluding those containing copper.

Figure 2:
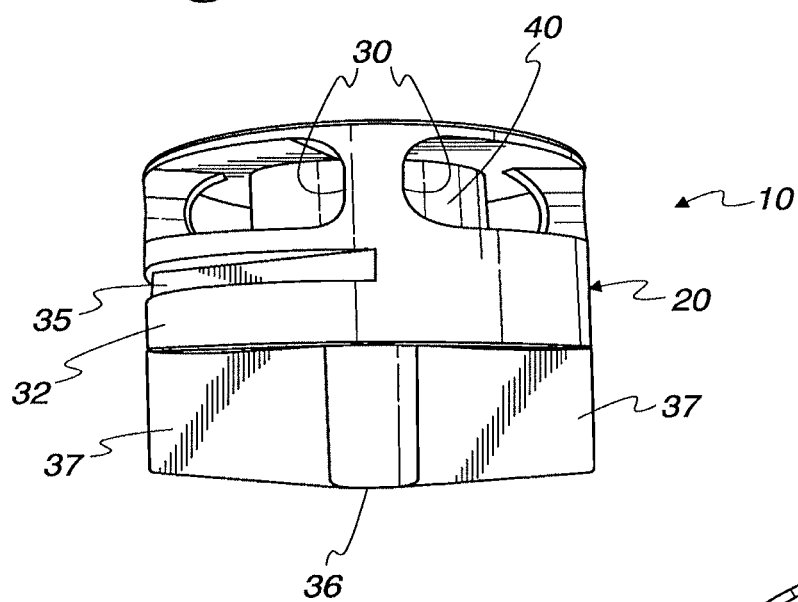
FIG. 2 depicts an assembled isometric representation of the target unit of FIG. 1, assembled.
Figure 3:
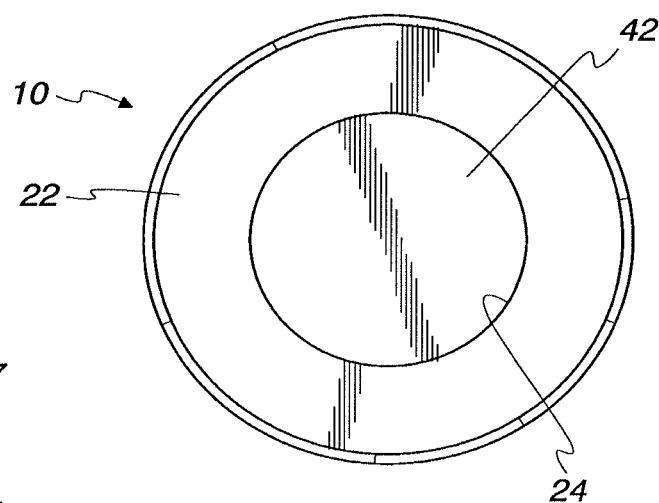
FIG. 3 depicts a top plan view of the assembled target unit of FIG. 1.
Figure 4:
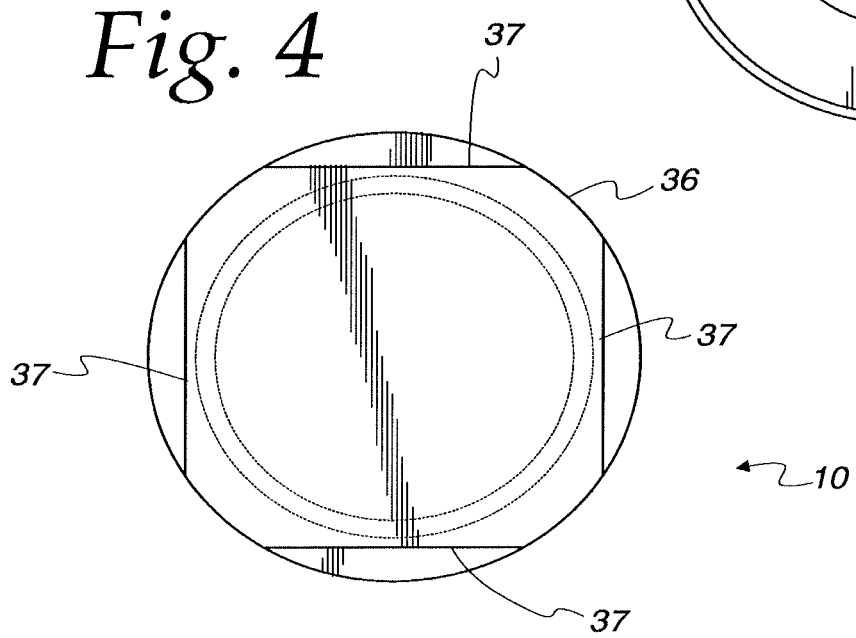
FIG. 4 depicts a bottom plan view of the assembled target unit of FIG. 1.

FIG. 2 provides an isometric view of assembled target unit 10. As illustrated in FIG. 2, screw-cap 36 includes flattened regions 37 to provide surfaces suitable to facilitate tightening of screw-cap 36 and cage body 20, e.g., by hand or with a wrench. FIG. 3 provides a top plan view of target unit 10, while FIG. 4 shows a bottom plan view, and illustrates the positioning of four flattened regions 37 symmetrically spaced along the circumference of screw-cap 36.

Figure 1A:
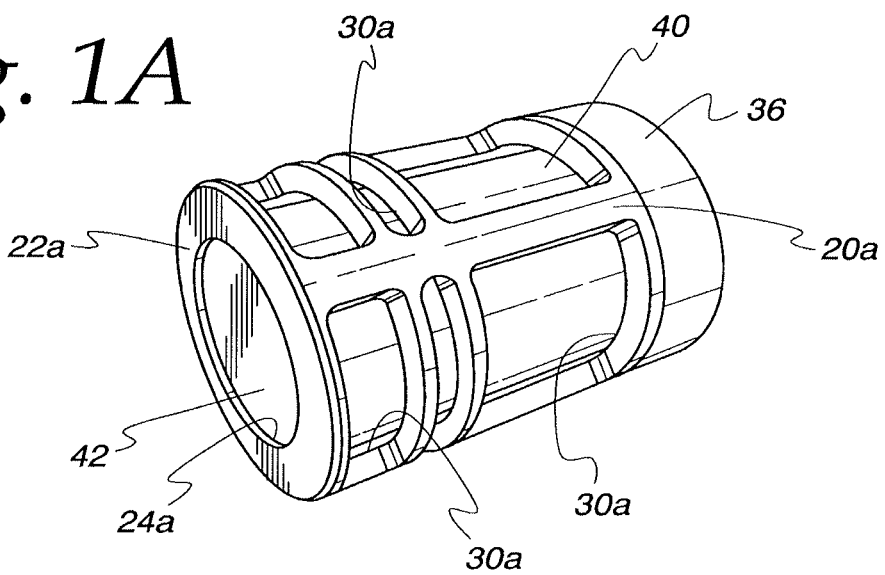
FIG. 1A depicts an isometric representation of an alternative target unit design, fully assembled.

FIG. 1A illustrates an alternative embodiment of target unit 10, in which cage body 20a defines a larger number of apertures 30a than cage body 20 of FIG. 1. Apertures 30 and 30a can be configured in any form or manner desired. The purpose of including apertures 30 or 30a in target unit 10 or 10a is to allow cooling water to contact capsule 40 during irradiation to prevent melting or partial melting of the zinc target ingot during irradiation.

Capsule 40 is a ceramic crucible, and can be constructed of alumina or aluminum nitride, for example, because these materials do not chemically combine with zinc. Alumina is preferred because it is inexpensive and is a well-characterized material. Test results have shown that use of capsules composed of alumina by the disclosed methods and equipment do not introduce undesirable metal and other impurities into the resulting Cu67 in significant amounts. Tests also have shown that the initial zinc target (or any fresh zinc to make up for losses) should be substantially free from traces of oxygen, e.g., by pre-purifying the zinc by sublimation to eliminate traces of oxygen; this beneficially promotes good physical contact, after casting, between the cooled solid zinc ingot and the ceramic capsule. If oxygen is present in the zinc, a gap between the capsule and the zinc ingot may form upon cooling of the molten zinc after filling of the capsule. Such gaps can lead to inefficient cooling, and failure of the target. When assembled, a small expansion gap, between about 2 and about 3 mm, preferably is provided between the zinc ingot and metal lid 46. This gap is sufficient to provide the zinc with adequate thermal creep to avoid cracking the capsule as it expands under high-power heating. In other embodiments, a small zinc foil may be fitted within the gap to allow for current leakage during electron beam irradiation, from the zinc metal to the metal lid. Tests have shown there is no galvanic corrosion inside capsule 40 during beam operations.

Cage bodies 20 and 20a provide physical protection to ceramic capsule 40, as well as an interface-connection to the target chamber at the electron linac. In a preferred embodiment, cage bodies 20 or 20a and screw-cap 36 are composed of different alloys of aluminum to minimize the possibility of thread galling. For example, cage bodies 20 or 20a can be composed of 6061 Al and screw-cap 36 can be composed of 2024 Al.

The size and configuration of the target unit (e.g., 10 or 10a) is dictated by the size and configuration of the target chamber and amount of zinc to be irradiated. Thus, the configuration of the target unit may be varied without departing from the spirit of the invention. While the preferred embodiment utilizes a cage body, lid having a gasket, washer and screw-cap to secure the capsule within the target unit, fewer components may be utilized, provided that a water-tight seal is created for the target capsule.

After the Zn68 has been irradiated for a sufficient period of time, the Cu67 produced in the target is isolated from the Zn68 by any suitable method. For example, the metallic target can be reacted with an acid to dissolve the metals and produce a mixture of metal ions (e.g., zinc and copper ions). The metal ions can then be separated from one another by chemical techniques that are well known in the art, including ion extraction, ion exchange, precipitation of insoluble metal salts, and the like. Preferably, the zinc is separated from copper by physical means, e.g., sublimation of zinc.

Zinc can be readily sublimed away from copper at an elevated temperature under vacuum. In a preferred embodiment, the Cu67 is isolated by sublimation of the zinc at a temperature in the range of about 500 to about 700° C. under vacuum, preferably at a pressure in the range of about $10^{-3}$ to about $10^{-5}$ Torr, to remove a substantial portion of the zinc and afford a residue containing Cu67. Preferably, at least about 90%, 95% or 99% of the zinc is removed by sublimation, more preferably at least about 99.9%, even more preferably at least about 99.99%, on a weight basis. The Cu67-containing residue preferably is further purified by chemical means, such as reaction with an aqueous acid to form a solution of metal ions, followed by ion extraction, ion exchange, or a combination thereof to recover Cu67 ions.

Figure 5:
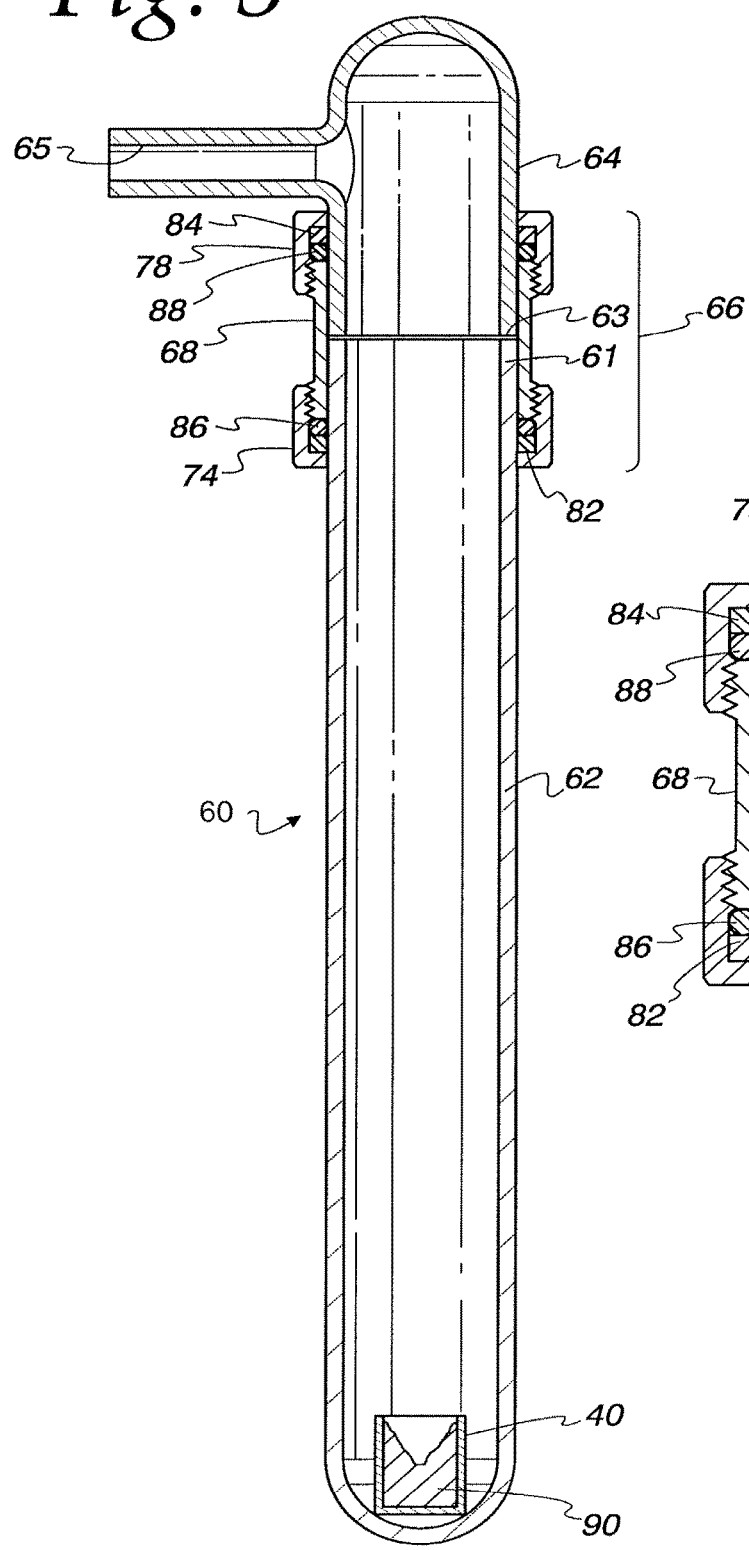
FIG. 5 depicts a cross-sectional representation of the sublimation apparatus useful in the methods of the present invention.
Figure 5A:
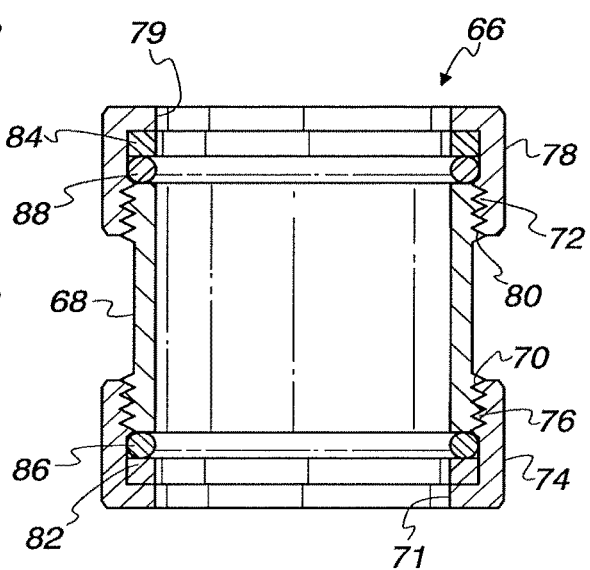
FIG. 5A depicts a detailed cross-sectional view of the coupler portion of the apparatus of FIG. 5.

An example of sublimation apparatus 60 for use in the methods of the present invention is shown in FIG. 5 and FIG. 5A, in cross-section. Sublimation apparatus 60 comprises sublimation tube 62, capsule 40, coupler unit 66 and vacuum dome 64, which includes port 65 for attachment to a vacuum source. Sublimation tube 62 includes open end 61, which is sized and configured to have similar dimension to open end 63 of vacuum dome 64. Coupler unit 66 seals open end 61 of tube 62 to open end 63 of vacuum dome 64, by means of O-rings 86 and 88.

FIG. 5A provides a detailed cross-sectional view of coupler unit 66, which comprises a tubular sheath 68, which is threaded at each end by male-threaded regions 70 and 72. Rings 74 and 78 include female-threaded regions 76 and 80, which are sized and configured to engage male-threaded regions 70 and 72 of sheath 68. Washers 82 and 84 are fitted within rings 74 and 78, respectively. O-rings 86 and 88 are disposed between the ends of sheath 68 and washers 82 and 84 when unit 66 is assembled. When rings 74 and 78 are screwed onto sheath 68, O-rings 88 and 86 are compressed between sheath 68 and washers 82 and 84. Ring 74 defines an aperture 71 which is sized and configured to receive open end 61 of sublimation tube 62, while ring 78 defines aperture 79, which is sized and configured to receive open end 63 of vacuum dome 64. O-rings 86 and 88 are sized to fit tightly against the exterior circumferences of sublimation tube 62 and vacuum dome 64, respectively. When rings 74 and 78 are tightened over sheath 68 with tube 62 and vacuum dome 64 received in apertures 71 and 79, O-rings 86 and 88 become compressed against tube 62 and vacuum dome 64 to form a vacuum-tight seal between tube 62 and vacuum dome 64.

In use, sublimation apparatus 60 is assembled with capsule 40, which contains a solid ingot 90 of irradiated Zn68, and is situated within sublimation tube 62. Coupler unit 66 is tightened to provide a vacuum-tight seal, and the lower portion of tube 62 is heated to a temperature in the range of about 500 to about 700° C., while applying a vacuum in the range of about $10^{-3}$ to about $10^{-5}$ Torr via port 65. Zinc from ingot 90 sublimes and collects along the inner surface of tube 62 in areas that are not heated, leaving behind a residue of Cu67 in capsule 40 at the end of the sublimation process. The heating and sublimation cycle should be sufficiently slow to avoid thermal cracking of sublimation tube 62 as known by those of ordinary skill in the art. After sublimation is complete, heating is ceased, and the apparatus is allowed to cool at a relatively slow rate.

Sublimation tube 62 preferably is composed of a ceramic material, such as alumina or boron nitride, because there is no chemical reaction between the ceramic and the zinc metal during sublimation. As there is no chemical reaction, no impurities are introduced to the Cu67. The material of construction of sublimation tube 62 may vary, provided that the selected material does not result in a corrosive chemical reaction with the Zn68 metal and Cu67 residue. Use of sublimation apparatus 60 is not limited to sublimation separation of Zn68 metal from Cu67 residue. If the sublimation body is used to sublime other types of materials, the sublimation body may be composed of a different material as known by those of ordinary skill in the art. Vacuum dome 64 can be composed of any suitable material, such as glass or metal. In the preferred embodiment, coupler unit 66 is composed primarily of stainless steel, with the exception of the O-rings, which can be any suitable chemically resistant polymeric material, such as, e.g., copolymers of hexafluoropropylene (HFP) and vinylidene fluoride (VDF or VF2), terpolymers of tetrafluoroethylene (TFE), vinylidene fluoride (VDF) and hexafluoropropylene (HFP), and the like, manufactured under the tradename VITON® by DuPont Performance Elastomers LLC. Other materials of construction may be utilized without departing from the spirit of the invention provided the chosen material does not result in unwanted contamination of the sublimed Zn68 and still provides for a leak-tight pressure seal.

Figure 5B:
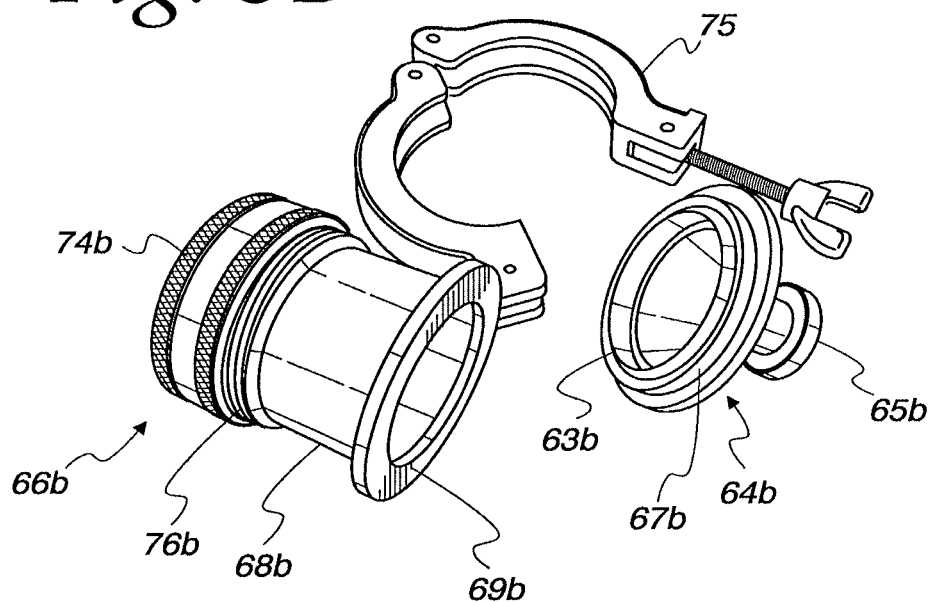
FIG. 5B depicts an isometric representation of an alternative vacuum head design for the apparatus of FIG. 5, partially disassembled.
Figure 5C:
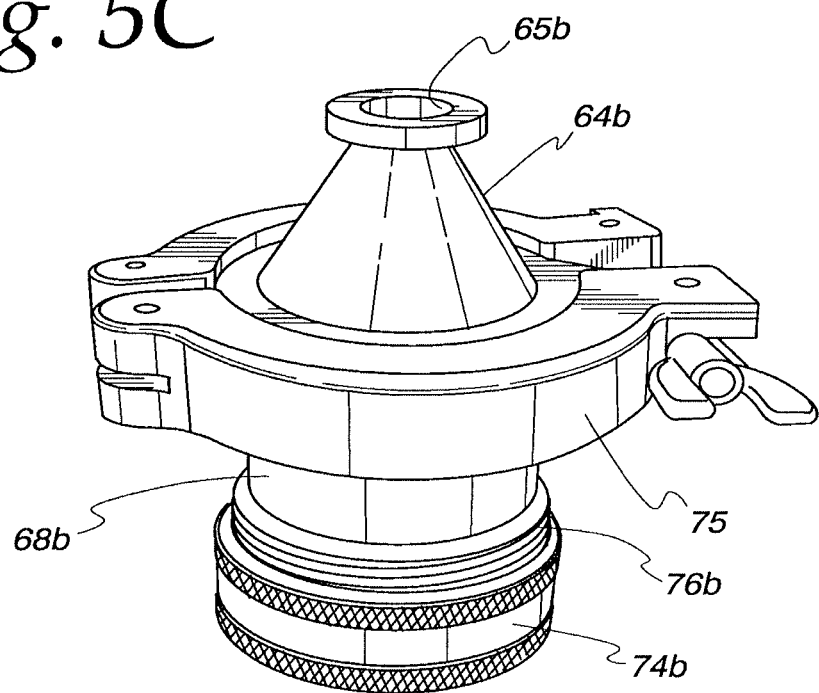
FIG. 5C depicts an isometric representation of the alternative vacuum head design shown in FIG. 5B, fully assembled.

FIG. 5B and FIG. 5C provide isometric views of an alternative configuration for the vacuum dome and coupler. FIG. 5B shows the parts partially disassembled, while FIG. 5C shows the dome and coupler attached to each other. Coupler unit 66b includes sheath 68b, which is threaded at one end for engagement with threaded ring 74b, with an O-ring, not shown, as described above with respect to FIG. 5. Sheath 68b also includes flange 69b at its other end. Vacuum dome 64b includes gasket 67b which is sized and configured to seal against flange 69b, when open end 63b of dome 64b is received within sheath 68b. Clamp 75 is sized and configured to compress gasket 67b against flange 69b, forming a vacuum-tight seal. Dome 64b also includes flanged vacuum port 65b for connection to a vacuum source. In the embodiments shown in FIGS. 5B and 5C, the components (other than the gasket and O-ring) preferably are composed of a metal such as stainless steel.

Test results have shown that the zinc-copper separation created through use of the disclosed sublimation apparatus and method is extremely efficient. Very little Cu67 transports with the sublimed-deposited zinc and extremely small amounts of zinc remain behind with the Cu67 in the capsule. The remaining Cu67 residue, however, can be further purified by dissolution in an acid (e.g., a mineral acid such as sulfuric acid, hydrochloric acid, phosphoric acid, nitric acid, or a combination of mineral acids). Tests have shown that ceramics, and in particular alumina, have negligible solubility in acids, so substantially no additional impurities are introduced through the further purification of the sublimed zinc by the acid solution.

The sublimed zinc can be further processed to efficiently separate the remaining traces of zinc from the copper using ion exchange with a copper and/or zinc selective ion exchange resin (e.g., a quaternized amine resin), anion exchange (BioRad AG 1-X8 columns), or a chelating or solvating extractant, preferably immobilized on an ion exchange resin or silica substrate, to afford a Cu67 salt of suitable purity and specific activity for use in human medical applications. In one embodiment, the copper residue is dissolved in hydrochloric acid and the resulting Cu67 ions are purified on a quaternary amine ion exchange resin, as is well known in the art (see e.g., Mushtaq, A., Karim, H., Khan, M., 1990. Production of no-carrier-added $^{64}$Cu and $^{67}$Cu in a reactor. J. Radioanal. Nucl. Chem. 141, 261-269).

Suitable metal chelating and solvating extractants are well known in the art and include, e.g., the CYANEX® brand extractants available from Cytec Industries, Inc., West Patterson, N.J., which comprise organophosphorous materials such as organophosphine oxides, organophosphinic acids, and organothiophosphinic acids. Such extractant can be immobilized on resin or silica beads, as is known in the art. See, e.g., U.S. Pat. No. 5,279,745; Kim et al., *Korean Journal of Chemical Engineering*, 2000; 17(1): 118-121; Naik et al., *Journals of Radioanalytical and Nuclear Chemistry*, 2003; 257(2): 327-332; Chah et al, *Separation Science and Technology*, 2002; 37(3): 701-716; and Jal et al., *Talanta*, 2004; 62(5): 1005-1028. The Cu67 recovered after ion exchange typically can be obtained in specific activity of up to 100 kCi/g at a purity suitable for human medical use.

The Zn68 sublimate is preferably recycled for use as another target, so as to reduce the level of cold copper contaminant in the Zn68 target with each successive recycle, thus affording a radioactive copper residue containing a higher ratio of Cu67 to non-radioactive copper after each recycle stage, as described above.

Figure 6:
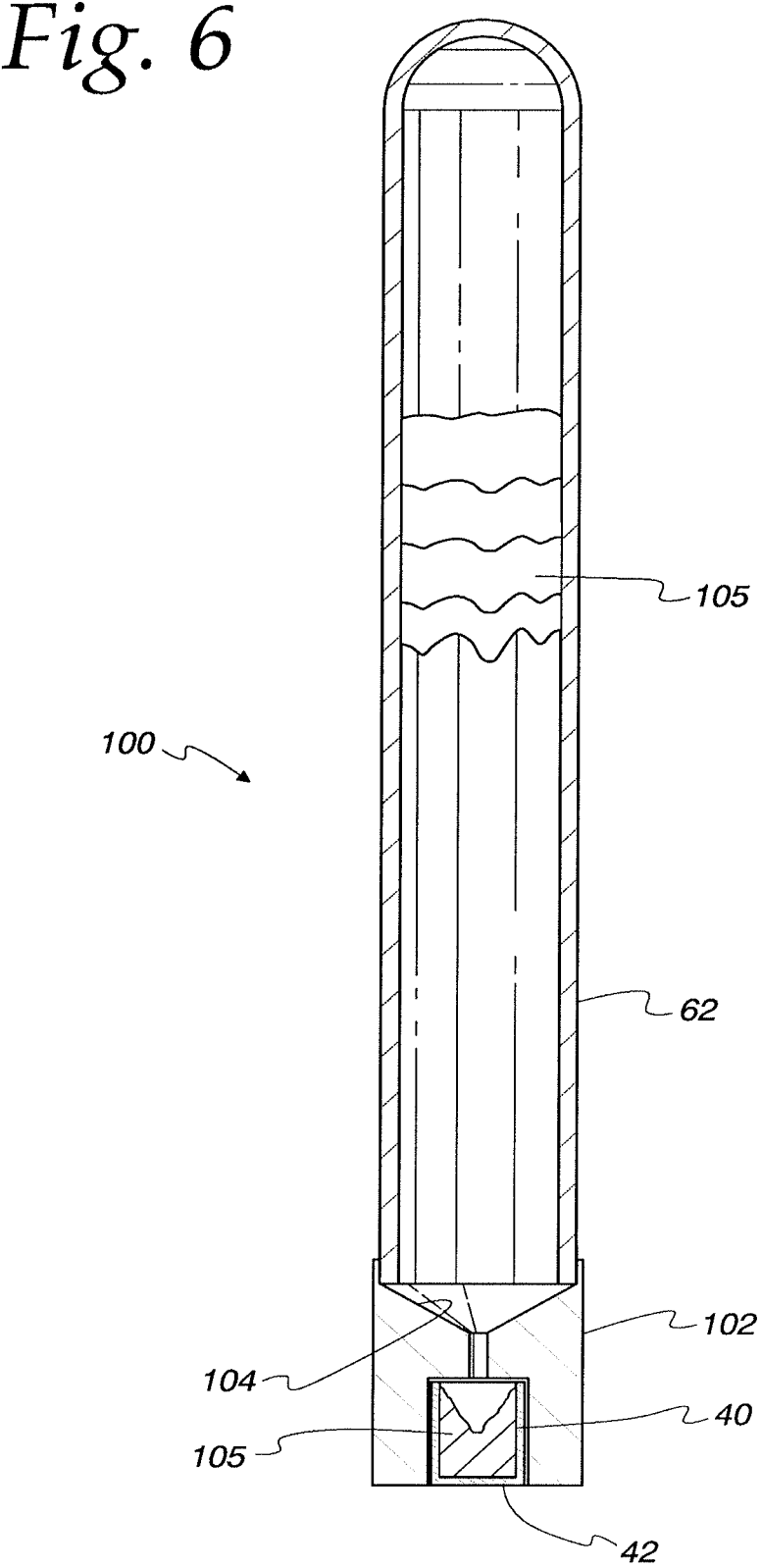
FIG. 6 depicts a cross-sectional representation of the sublimation tube and hopper useful in the methods of the present invention.

FIG. 6 shows exemplary recycling apparatus 100 to recycle Zn68 sublimate 105 for use as another target. Recycling apparatus 100 includes sublimation tube 62, hopper 102 and capsule 40 (e.g., as described in FIGS. 1-5). Sublimation tube 62 including Zn68 sublimate 105 on the interior wall of the tube is inverted and placed over hopper 102. Hopper 102 has a substantially cylindrical exterior and includes an internal funnel 104 configured to deposit molten liquid Zn68 into capsule 40 when sublimation tube 62 is heated to melt the zinc deposited on the interior of the tube. In the preferred embodiment, hopper 102 is composed of a high density, high purity graphite such as POCO; optionally the graphite can be coated with glassy carbon. Hopper 102, however, may be composed of a variety of different materials provided the material does not chemically react with the liquid zinc.

During use recycling apparatus 100 is placed within a hermetic surround (not shown) as known by those of ordinary skill in the art to create an inert gas structure substantially free of oxygen around apparatus 100. The hermetic surround is then inserted into a furnace or other heating apparatus so that sublimed zinc 105 melts from sublimation tube 62. The hermetic surround may be composed of quartz, steel, or any other suitable material. Hopper 102 directs the molten liquid Zn68 into capsule 40. In the preferred embodiment, this process is done with an inert gas fill at atmospheric pressure, with temperatures in the range of about 450 to about 550° C. Experiments have shown that it is possible to process and recycle the zinc in the manner described into new target ingots contained within new capsules with negligible loss of the zinc material. The melt and fill cycle must be sufficiently slow (about 2 to about 3° C. per minute heating rate) to avoid thermal cracking of the sublimation tube (e.g., an alumina tube).

Measurements have shown that the target unit disclosed herein results in very low radiation dose rate from the structural materials because alumina and aluminum are low-activation materials. After linac operations, the principal radiation hazard is provided by the zinc target material itself. Operations with enriched Zn68 (>99%) are characterized by even lower activation, since Cu67 will be the predominant isotope, and it has a very soft gamma emission which is easy to shield.

The following example is provided to further illustrate certain aspects of the present invention, and is not to be construed as limiting the invention in any way.

EXAMPLE 1

Sublimation of Zinc Target Ingot

Sublimation separation of the irradiated metallic zinc from the Cu67 radioisotope was achieved on a zinc target ingot. The solid zinc target ingot within an alumina capsule was placed within a vacuum-tight alumina sublimation tube. The bottom of the sublimation tube was placed into a tube furnace and heated under an internal vacuum, to around 700° C. The sublimed zinc deposited on the cooler top of the sublimation tube, which was outside the furnace. Sublimation occurred very rapidly, at about greater than 40 g/h under a modest vacuum of about 1 mTorr. The heating and sublimation cycle was sufficiently slow, about less than 3° C. per minute, to avoid thermal cracking of the alumina. Once the sublimation process was complete, the furnace was shut down and the system was allowed to cool at a slow rate.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A device for sublimation of Zn68 from Cu67 comprising:
   a ceramic sublimation tube having an open end, a closed end, and defining an interior region;
   a ceramic capsule containing a target ingot that contains Zn68 and Cu67, the capsule having an open end and a closed end, and defining an interior chamber housing the target ingot; the ceramic capsule being positioned within the interior region of the sublimation tube with the closed end of the capsule contacting the closed end of the sublimation tube; and
   a coupler sized and configured to releasably couple the open end of the sublimation tube with a vacuum source and form a leak-tight vacuum seal over the sublimation tube.

2. The device of claim 1, wherein the ceramic sublimation tube is composed of a material selected from the group consisting of alumina and boron nitride.

3. The device of claim 1, wherein the ceramic capsule is composed of a material selected from the group consisting of alumina and aluminum nitride.

4. The device of claim 1, wherein one or more O-rings are disposed between the sublimation tube and the coupler to aid in sealing the open end of the sublimation tube to the vacuum source.

5. The device of claim 4, wherein the O-rings are composed of a chemically resistant polymer selected from the group consisting of a copolymer of hexafluoropropylene (HFP) and vinylidene fluoride, and a terpolymer of tetrafluoroethylene (TFE), vinylidene fluoride (VDF) and hexafluoropropylene (HFP).

6. A device for sublimation of Zn68 from Cu67 comprising: a ceramic sublimation tube having an open end, a closed end, and defining an interior region; a ceramic capsule containing a target ingot that contains Zn68 and Cu67, the capsule having an open end and a closed end, and defining an interior chamber housing the target ingot; the ceramic capsule being positioned within the interior region of the sublimation tube with the closed end of the capsule contacting the closed end of the sublimation tube; and
   a coupler positioned over the open end of the sublimation tube; the coupler being sized and configured to releasably couple the open end of the sublimation tube with a vacuum source—and form a leak-tight vacuum seal; wherein the coupler comprises:
   (a) a vacuum dome defining a closed end, an open end, and a vacuum port; the open end of the vacuum dome being oriented facing the open end of the sublimation tube;
   (b) a removable tubular sheath positioned over the open ends of the vacuum dome and the sublimation tube; the sheath defining a first open end and a second open end opposed to the first open end; the tubular sheath and the first and second open ends being sized and configured to surround the open ends of the vacuum dome and the sublimation tube; the sheath comprising a first male-threaded region adjacent each the first open end thereof, and a second male-threaded region adjacent the second open end thereof;
   (c) a first threaded ring at the first open end of the tubular sheath; the first threaded ring comprising a female-threaded region sized and configured to engage the first male-threaded region of the tubular sheath, and a first internal washer spaced from the female-threaded region of the first threaded ring;
   (d) a second threaded ring at the second open end of the tubular sheath; the second threaded ring comprising a female-threaded region sized and configured to engage the second male-threaded region of the tubular sheath, and a second internal washer spaced from the female-threaded region of the second threaded ring;
   (e) a first O-ring disposed within the first threaded ring between the first washer and the female-threaded region of the first threaded ring, the first O-ring contacting an exterior wall of the vacuum dome; and
   (f) a second O-ring disposed within the second threaded ring between the second washer and the female-threaded region of the second threaded ring, the second O-ring contacting an exterior wall of the sublimation tube;
   wherein the first O-ring is compressed between the adjacent first open end of the tubular sheath, the adjacent first washer, and the adjacent exterior wall of the vacuum dome, and the second O-ring is compressed between the adjacent second open end of the tubular sheath, the adjacent second washer, and the adjacent exterior wall of the sublimation tube, when the female-threaded regions of the first and second threaded rings are engaged with and tightened onto the first and second male-threaded regions of the tubular sheath, respectively; thereby forming a vacuum-tight seal between the vacuum dome and the sublimation tube.

7. The device of claim 6, wherein the tubular sheath and the threaded rings are composed of stainless steel.

8. The device of claim 6, wherein the vacuum dome is composed of glass or a metal.

9. The device of claim 6, wherein the ceramic sublimation tube is composed of a material selected from the group consisting of alumina and boron nitride.

10. The device of claim 6, wherein the ceramic capsule is composed of a material selected from the group consisting of alumina and aluminum nitride.

11. The device of claim 6, wherein the O-rings are composed of a chemically resistant polymer selected from the group consisting of a copolymer of hexafluoropropylene (HFP) and vinylidene fluoride, and a terpolymer of tetrafluoroethylene (TFE), vinylidene fluoride (VDF) and hexafluoropropylene (HFP).

12. A device for sublimation of Zn68 from Cu67 comprising:
   a ceramic sublimation tube having an open end, a closed end, and defining an interior region;
   a ceramic capsule containing a target ingot that contains Zn68 and Cu67, the capsule having an open end and a closed end, and defining an interior chamber housing the target ingot; the ceramic capsule being positioned within the interior region of the sublimation tube with the closed end of the capsule contacting the closed end of the sublimation tube; and
   a coupler positioned over the open end of the sublimation tube; the coupler being sized and configured to releasably couple the open end of the sublimation tube with a vacuum source and form a leak-tight vacuum seal;
   wherein the coupler comprises:
   (a) a vacuum dome defining a vacuum port surrounded by a first flange, an opposed open end, and second flange surrounding the open end; the open end of the vacuum dome being oriented facing the open end of the sublimation tube;
   (b) a removable tubular sheath comprising two open ends, a third flange surrounding one open end thereof, and a male-threaded region surrounding the other open end thereof, the tubular sheath being sized and configured to surround the open end of the sublimation tube; and the third flange being oriented facing with the second flange of the vacuum dome with a gasket therebetween;
   (c) a threaded ring comprising a female-threaded region sized and configured to engage the male-threaded region of the tubular sheath, and an internal washer spaced from the female-threaded region;
   (d) an O-ring disposed within the threaded ring, the O-ring contacting an exterior wall of the sublimation tube; and
   (e) a removable clamp sized and configured to compress the gasket against the second flange and the third flange to form a vacuum-tight seal when the clamp is engaged around the second flange and the third flange;
   wherein the O-ring is compressed between the adjacent open end of the tubular sheath and the adjacent exterior wall of the sublimation tube when the female-threaded region of the threaded ring is engaged with and tightened onto the male-threaded region of the tubular sheath, thereby forming a vacuum-tight seal between the tubular sheath and the sublimation tube.

13. The device of claim 12, wherein the tubular sheath and the threaded rings are composed of stainless steel.

14. The device of claim 12, wherein the vacuum dome is composed of glass or a metal.

15. The device of claim 12, wherein the ceramic sublimation tube is composed of a material selected from the group consisting of alumina and boron nitride.

16. The device of claim 12, wherein the ceramic capsule is composed of a material selected from the group consisting of alumina and aluminum nitride.

17. The device of claim 12, wherein the O-ring is composed of a chemically resistant polymer selected from the group consisting of a copolymer of hexafluoropropylene (HFP) and vinylidene fluoride, and a terpolymer of tetrafluoroethylene (TFE), vinylidene fluoride (VDF) and hexafluoropropylene (HFP).

18. The device of claim 12, wherein the first flange has a smaller diameter than the second flange, and the vacuum dome has a conical shape between the first flange and the second flange which increases in diameter in the direction from the first flange to the second flange.

\* \* \* \* \*